United States Patent [19]
Kemper

[11] Patent Number: 5,887,691
[45] Date of Patent: Mar. 30, 1999

[54] CONTROLLED FORCE ACTUATOR SYSTEM

[76] Inventor: Yves J. Kemper, 2626 Norwood Dr., Bloomfield Hills, Mich. 48302

[21] Appl. No.: 746,887

[22] Filed: Nov. 15, 1996

Related U.S. Application Data

[60] Provisional application No. 60/006,874, Nov. 17, 1995, and provisional application No. 60/007,450, Nov. 22, 1995, and provisional application No. 60/008,234, Dec. 7, 1995.

[51] Int. Cl.$^6$ .............................. F16D 13/71; F16D 55/02
[52] U.S. Cl. ..................................... 192/89.22; 192/70.27; 188/72.3; 267/161
[58] Field of Search .............................. 192/70.27, 89.22, 192/89.23, 89.24; 267/161; 188/72.2, 72.3, 161, 163, 164, 166; 335/274

[56] References Cited

U.S. PATENT DOCUMENTS

| | | |
|---|---|---|
| 3,323,624 | 6/1967 | Maurice . |
| 5,088,584 | 2/1992 | Inaba et al. ........................ 192/70.27 X |
| 5,265,709 | 11/1993 | Takeuchi et al. ................. 192/70.27 X |
| 5,400,887 | 3/1995 | Mizukami et al. ................... 192/89.23 |
| 5,409,091 | 4/1995 | Reik et al. ............................ 192/70.25 |
| 5,579,881 | 12/1996 | Weidinger . |
| 5,671,834 | 9/1997 | Mizukami et al. ................... 192/89.23 |
| 5,715,920 | 2/1998 | Lindner et al. .................. 192/89.23 X |
| 5,794,753 | 8/1998 | Kemper ............................ 192/70.27 X |

FOREIGN PATENT DOCUMENTS 2 287 994   10/1995   United Kingdom .

OTHER PUBLICATIONS

Dr.–Ing. Wolfgang Reik, "The Self–Adjusting Clutch–SAC," "LuK Drive Train Systems, Comfort and Economy, May 27, 1994.

Primary Examiner—Richard M. Lorence
Attorney, Agent, or Firm—Finnegan, Henderson, Farabow, Garrett & Dunner, L.L.P.

[57] ABSTRACT

A contolled force actuating system having a positive Belleville spring and a negative Belleville spring arranged in series between a load member and a reaction member. The positive Belleville spring is initially in a relaxed condition and the negative Belleville spring being initially in a loaded energy storing condition. A movable control device engages at least the negative Belleville spring so that movement of the control device releases stored energy from the negative Belleville spring to the positive Belleville spring. The combined energy stored in both the positive and negative Belleville springs is applied between the reaction member and the load member. The Belleville springs may be designed so that the rate of energy release from the negative Belleville is substantially the same as, less than, or greater than the rate of energy storage by the positive Belleville spring, depending on whether the application of the system is served by a minimal the control force to move the control device, a control force that may be removed after the application of force between the reaction member and the load member, such as in an automotive clutch, or a control force that must be exerted to maintain that application of force, such as in a friction brake.

22 Claims, 12 Drawing Sheets

CONTROLLED FORCE ACTUATOR SYSTEM

CROSS REFERENCE TO RELATED APPLICATIONS

This application claims the benefit of three U.S. Provisional applications, each entitled CONTROLLED FORCE ACTUATOR SYSTEM, as follows: Ser. No. 006,874/60, filed Nov. 17, 1995; Ser. No. 007,450/60, filed Nov. 22, 1995; and Ser. No. 008,234/60, filed Dec. 7, 1995, the disclosures of which are incorporated by reference.

BACKGROUND OF THE INVENTION

This invention relates to controlled force actuating systems and more particularly, to an actuating system in which an actuating force is supplied by controlled release of a loaded spring. The actuating system is particularly applicable to the development of normal forces for friction devices such as power transmitting clutches or friction brakes but is also useful in other applications.

Numerous diverse types of mechanisms employ a force acuator system by which energy stored in a spring is released to develop a loading force on a component and by which the loading force is removed by restoring energy to the spring. Most commonly, the force actuating system uses a control device having a built-in mechanical advantage so that the control force required to remove the loading force, or to control its release, is relatively small as compared with the loading force. Force actuator systems of this basic type have a wide range of applications including, by way of example only, friction devices such as clutches and brakes, fluid control valves, hand operated devices such as clamps, closure retaining mechanisms, and other such spring actuated mechanisms.

Automotive power transmitting or starting clutches represent one of the more challenging applications of controlled force actuating systems in which a relatively large amount of energy stored in a spring must be controlled during release and restorers to the spring. Such clutches employ frictionally engaged torques tansmitting components which must remain fixed to each other by the spring force without slippage when fully engaged, and which must be engaged under control to avoid an abrupt transition of power transmission during engagement. Traditionally, the relatively large force actuating springs of automotive clutches have been operated by control systems involving levers, ball ramps or other force reduction devices by which the actuating spring may be controlled by a foot pedal, for example.

The conventional contol systems for automotive starting clutches are not only complex and space consuming, but also, the, are not suited to automation because of the large amounts of energy required for their operation. In this latter respect, the development of on-board computers in automotive vehicles has given rise to much interest in automating the operating of starting clutches and the power transmissions with which they are used. In spite of many recent attempts to accomplish such automation, the energy requirements to retract and control the release of the clutch spring have been a major obstacle.

Hence, there is an acute need for a controlled force actuating system by which a large spring force can be exerted but which can be operated by a relatively small amount of contol energy. This need exists not only in automatic clutch applications, but also in numerous other applications where spring stored energy is released and retacted to and from a load.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the contolled force actuating system of the invention comprises a positive spring and a negative Belleville spring arranged in series between a load member and a reaction member. The positive spring, preferably but not necessarily a Belleville spring, operates between a relaxed condition and a loaded condition as the negative Belleville spring releases energy from an inverted condition to which it is initially loaded. A movable control device engages at least the negative Belleville spring so that movement of the control device controls release of the negative Belleville spring for transfer of energy stored therein to the positive Belleville spring. The combined energy stored in both the positive and negative Belleville springs is thus applied between the reaction member and the load member.

In another aspect, the invention comprises a method of applying an actuating force between a load member and a reaction member. The method includes the steps of arranging a positive Belleville spring and a negative Belleville spring in series between the load and reaction members so that the positive Belleville spring is initially relaxed and the negative Belleville spring is initially loaded with energy, and transfering energy stored in the negative Belleville spring to the positive Belleville spring, whereby the combined energy stored in both the positive and negative Belleville springs results in a force applied between the reaction member and the load member.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Figure 8:
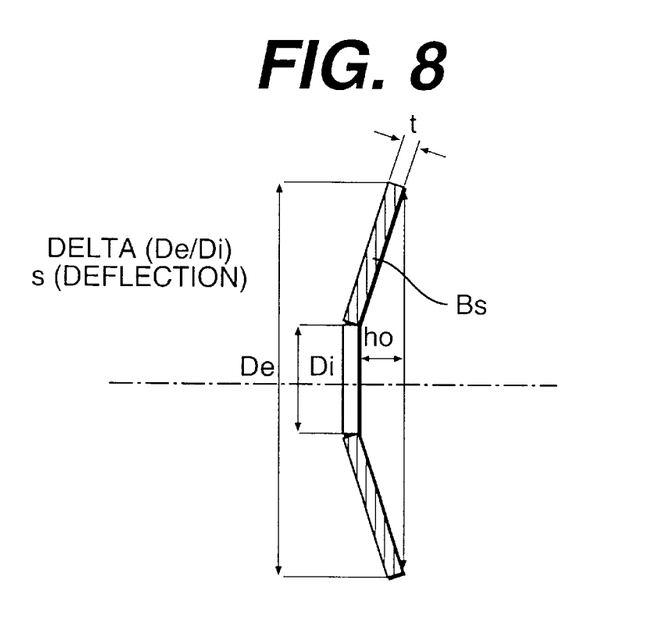
FIG. 8 is a cross-section illustrating parameters of a Belleville spring.

Because the operation of the actuating system of the invention is dependent largely on the characteristics of a negative Belleville spring, reference is first made to FIG. 8 in which the dimensions of a typical Belleville spring Bs are indicated to include an outside diameter DE, an inside diameter DI, a thickness t, and a conical height ho.

Figure 4:
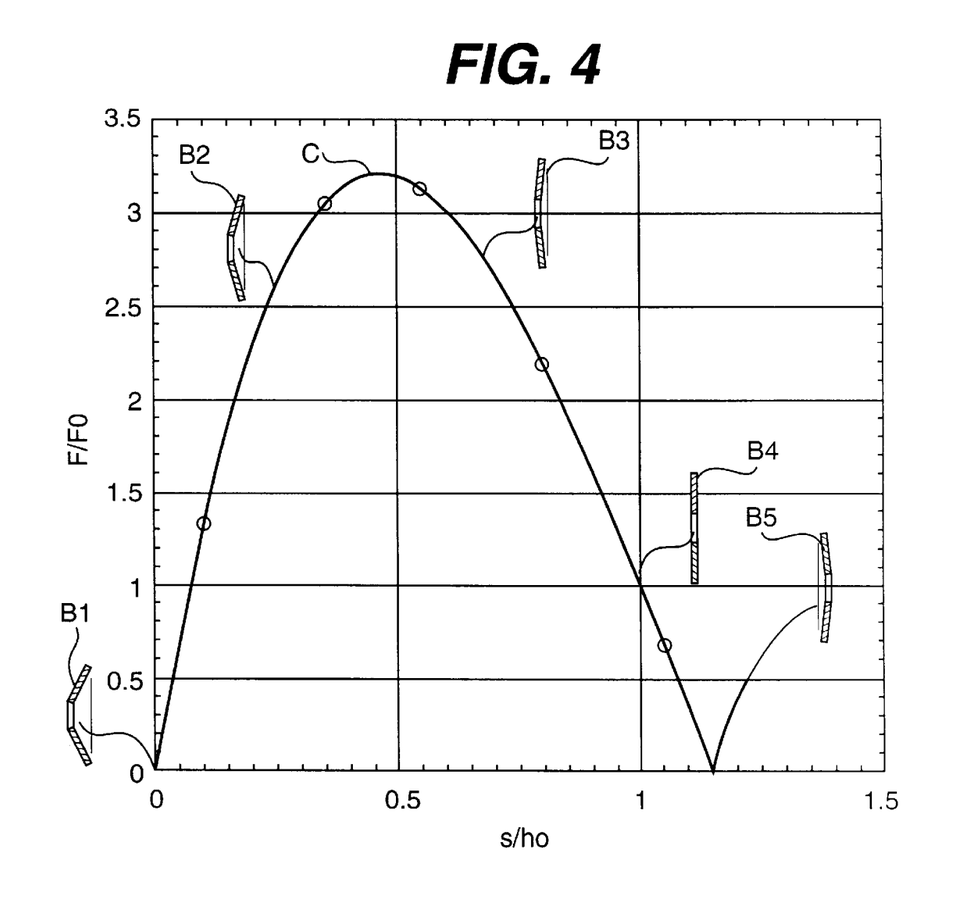
FIG. 4 is a graph illustrating force versus deflection characteristics of a Belleville spring.

An example of the force deflection characteristics of a Belleville spring are illustrated in FIG. 4. In particular, relative units of force are given on the ordinate of the curve C in FIG. 4 whereas relative units of deflection are indicated on the abscissa. In a state of rest, the Belleville spring will be in the condition illustrated in FIG. 8, for example. This state is also illustrated by an icon B1 in FIG. 4 when F/Fo=0 and s/ho=0. If an axial force F is applied to the Belleville spring, a deflection s in an axial direction will occur, as represented by the reduced height of the icon B2, but with the applied force increasing to a maximum as illustrated on the side of the curve C shown in FIG. 4 to the left of the top of the curve C representing a deflection s/ho of approximately 0.45. With continued deflection, depicted by the icons B3, B4 and B5, the applied force begins to reduce after reaching the maximum, and diminishes on the side of the curve C to the right of the top of the curve C, down to zero. In this deflection process, it will be noted that when s/ho=1, the configuration of the Belleville spring will have reached a flat configuration, as represented by the icon B4. Also, after passing the flat configuration, the applied force is further reduced along the curve C to zero, and at maximum deflection, is inverted or cocked as depicted by the icon B5.

The term "negative Belleville spring" is used herein and in the appended claims to designate a Belleville spring that is initially loaded with energy and that operates between s/ho=0.45 and 1.25 in the example of FIG. 4, or generally between the maximum spring force and zero with the spring inverted. The term "positive Belleville spring" is used to designate a Belleville spring that is initially unloaded or relaxed and that operates along along the left side of the curve C shown in FIG. 4, or a spring that is deflected generally between its initial shape and a point of maximum stored spring force. Because the energy storage and release rates of the positive Belleville spring so deflected are generally linear, other types of springs may be substituted for the positive Belleville spring. Therefore, the term "positive spring," as used herein and in the appended claims is intended as a generic designation of Belleville springs and other springs that exibit the force/travel characteristics represented by the left side of the curve C in FIG. 4.

An important feature of the negative Belleville spring is that when it releases the energy stored therein from the condition represented by the icon B5, the force of the released energy increases from minimum to maximum values as deflection S is decreased as represented by the right side of the curve C shown in FIG. 4.

In accordance with the present invention, a force actuator system is provided in which two springs are used in series, one of the two springs being a negative Belleville spring, whereas the other is a positive spring. Thus, the negative Belleville spring is initially preloaded whereas the positive spring operates as a spring that can be loaded and unloaded.

Figure 1:
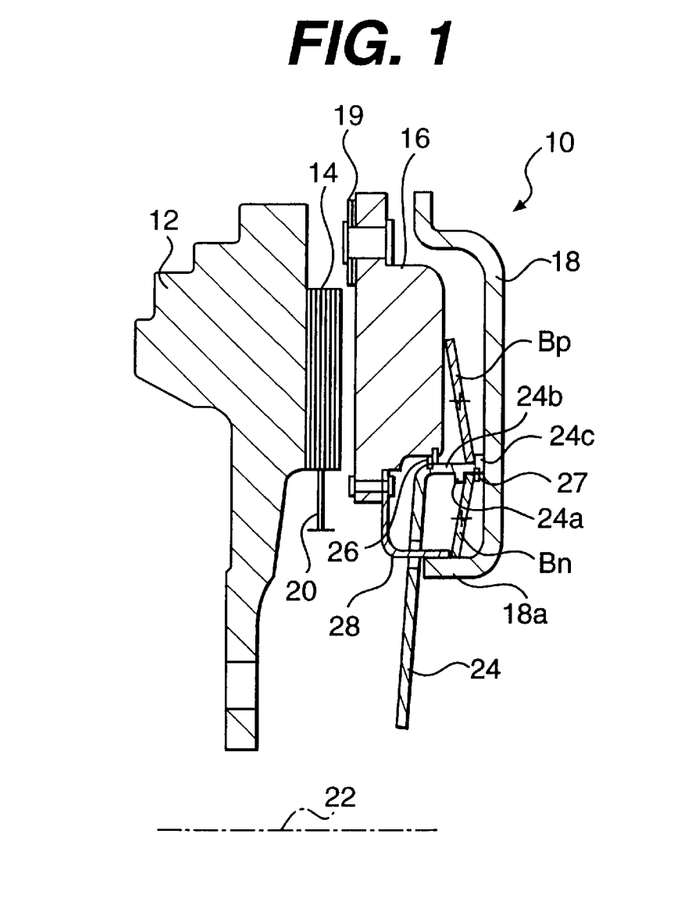
FIG. 1 is a fragmentary cross-section illustrating the actuating system of the invention applied to an automotive starting clutch.
Figure 2:
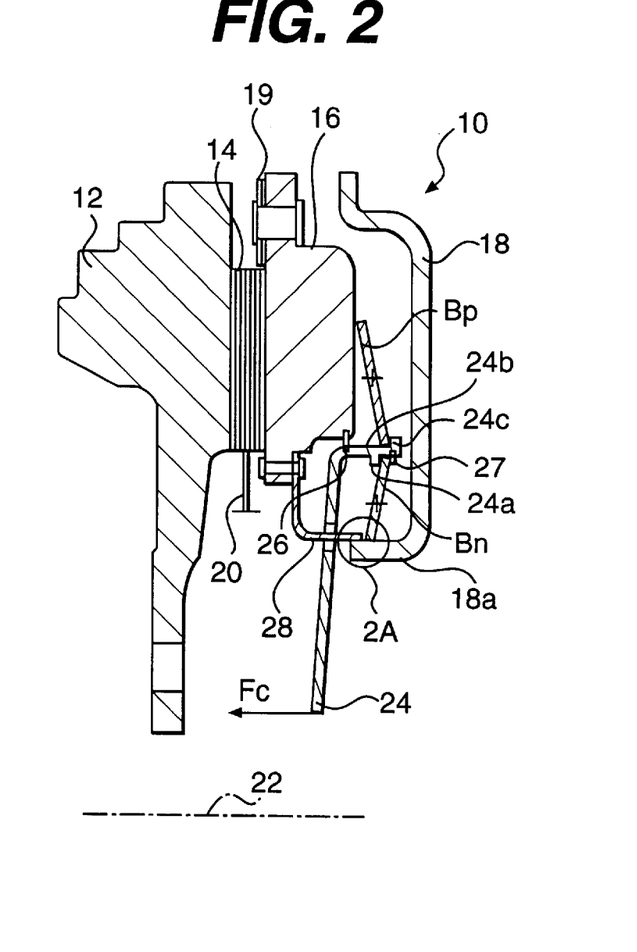
FIG. 2 is a fragmentary cross-section illustrating the actuator system of FIG. 1 in a different operating condition.
Figure 2A:
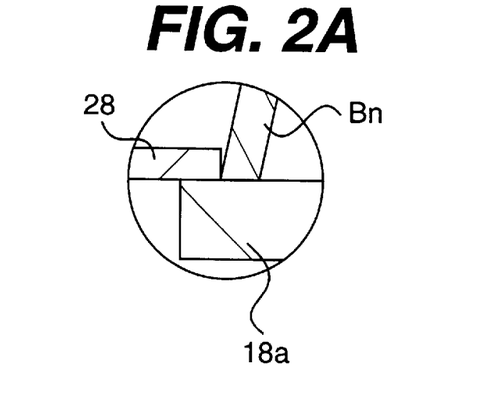
FIG. 2A is an enlarged illustration of parts in the sight circle 2A of FIG. 2.
Figure 3:
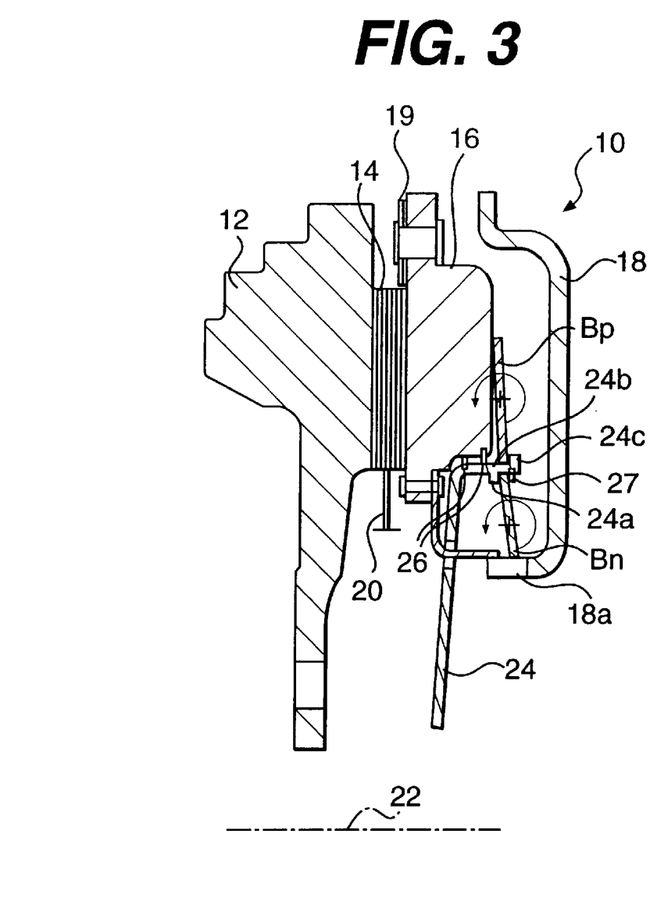
FIG. 3 is a fragmentary cross-section illustrating the actuating system in the clutch of FIG. 1 which has been completely closed.

In FIGS. 1–3, an automotive clutch organization is generally designated by the reference numeral 10 and illustrated as including such conventional components as a flywheel 12, a clutch cushion 14, a pressure plate 16, and a back plate 18. Although not shown as such in FIGS. 1–3, the back plate 18 is fixed to the flywheel 12 for rotation therewith and against axial displacement with respect to the flywheel 12 as is well known in the art. Also, the pressure plate 16 is connected to rotate with the flywheel, or alternatively with the back plate, by a set of three springs 19, which apply an axial force tending to pull the pressure plate away from the flywheel. Input power is supplied to the clutch 10 through the flywheel 12. Output power is delivered from the clutch 10 through a radial disc 20, when the clutch is closed or engaged, to an appropriate output shaft (not shown). In FIGS. 1–3, only half-sections of components are shown. In practice all illustrated components are symetrical about and rotatable on a central axis 22.

In accordance with the invention, the automotive clutch 10 is equipped with a contolled force actuating system including an initially relaxed positive spring and an initially loaded and cocked negative Belleville spring arranged in series between a load member and a reaction member. A movable control device engages at least the negative Belleville spring so that movement of the control device transfers energy back and forth between the negative Belleville spring and the positive Belleville spring. The transfer of energy from the positive spring to the negative Belleville spring, and vice versa, varies the force applied between the reaction member and the load member.

In the embodiment of the invention shown in FIGS. 1–3, a rigid control cone 24, having a measure of axial travel in response to a control force Fc, is used to operate the clutch 10. A pair of split rings 26, one connected to the pressure plate 16 and the other connected to the control cone 24, enable the cone 24 to pull the pressure plate 16 away from the clutch cushion 14. In this respect, the annular springs 19 may exert a slight bias opposing this action by the control cone to insure contact of the split rings 26. Preferably, the control force Fc to move the control cone is supplied by a linear electric motor (not shown), but may be supplied by other low-power devices, such as a solenoid, or by a manually operated device, as will be appreciated from the description to follow.

A negative Belleville spring Bn extends between the back plate 18, the reaction component, and the control cone 24, whereas a positive Belleville spring Bp extends between the control cone 24 and the pressure plate 16, the loaded component. In particular, the negative Belleville spring Bn, which is annular in configuration to have inner and outer edges, is arranged with its inner edge engaged with an inner axial flange 18a of the back plate 18, and with its outer edge in abutment with an internal rib 24a on an axial portion 24b of the control cone 24. A split ring 27, connected to the axial portion 24b, cooperates with the rib 24a to capture the outer edge of the negative Belleville spring Bn. The positive Belleville spring Bp, also of annular shape but of a larger diameter than the negative Belleville spring Bn, is arranged with its inner edge in abutment with an outer rib 24c on the axial portion 24b of the control cone. Fingers 28 on the pressure plate 16 function to limit travel of the inner edge of the negative Belleville spring on the backplate flange 18a as soon as movement of the pressure plate is resisted by the clutch cushion 14.

As in conventional clutch operation, an actuating spring force is used to urge the pressure plate 16 toward the flywheel and against the clutch cushion 14. An important aspect of the present invention, however, is that the actuating spring force is controlled by a very small control force Fc applied to the control cone 24. In particular, movement of the control cone 24 in a direction to the left in FIGS. 1–3 will cause the negative Belleville spring Bn to start releasing force stored therein and apply an increasingly strong actuating force to the outer positive Belleville spring Bp. Since the outer positive Belleville spring is connected in series to the negative Belleville spring by the control cone, it accumulates the energy released by the negative Belleville spring and a large actuating force is developed between the back plate and the pressure plate tending to urge the pressure plate toward the flywheel. Yet, only a small control force Fc is needed to control the release of energy from and return energy to the negative Belleville spring. An understanding of this operation may be gained from the graph of FIG. 5.

Figure 5:
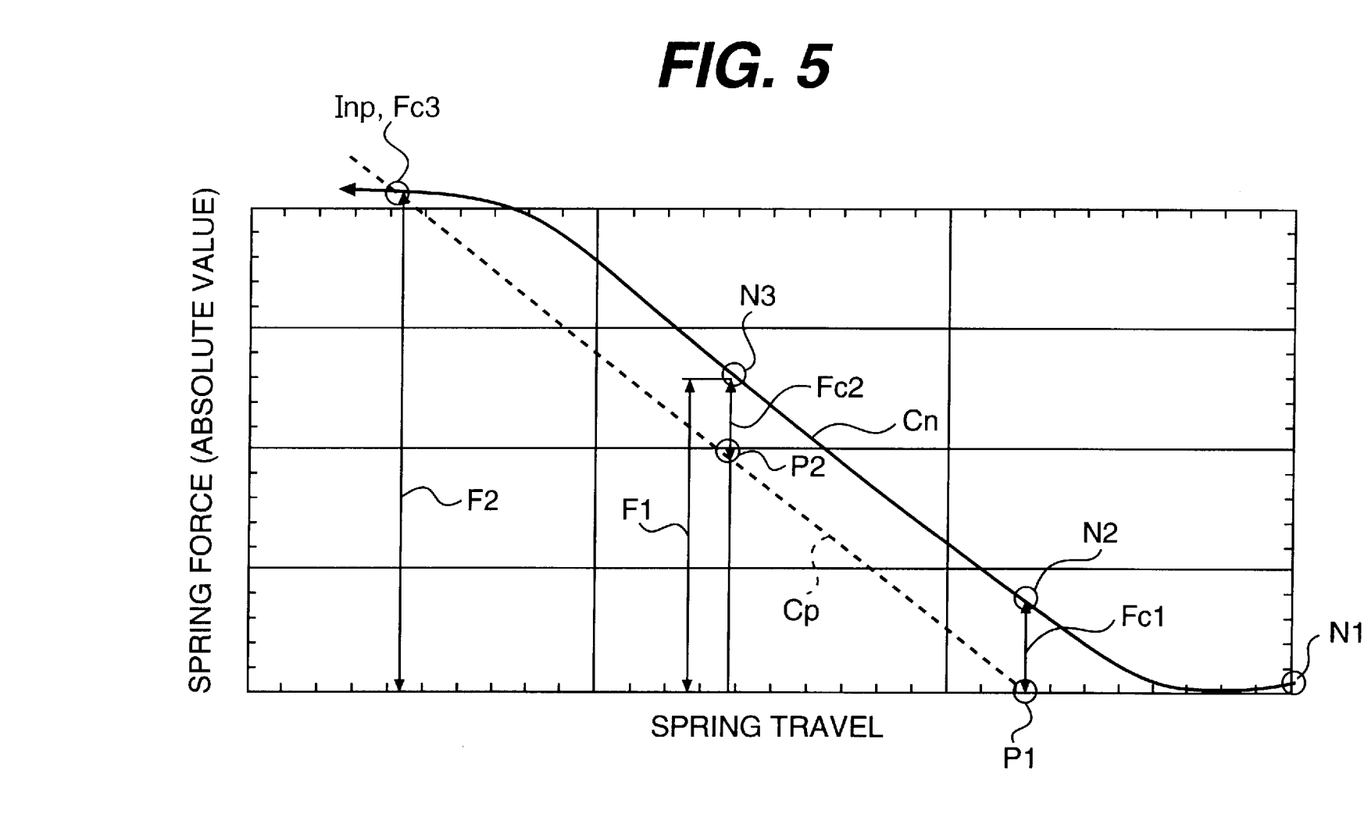
FIG. 5 is a graph in which the force/deflection characteristics of separate positive and negative Belleville springs are represented by respective curves.

In FIG. 5, two curves Cn and Cp represent respectively, the force/deflection characteristics of the Belleville springs Bn and Bp in the clutch 10. The initial condition of the negative Belleville spring Bn is represented at a point N1 on the curve Cn and the initial relaxed condition of the positive Belleville spring Bp is represented by the point P1 on the curve Cp. The vertical relationship of the two curves Cn and Cp represents a design of the Belleville springs Bn and Bp in which the amount of force released by the negative Belleville spring Bn exceeds the amount of force being stored in the positive Belleville spring Bp. Thus, in the absence of a control force Fc on the control cone 24, in the embodiment of FIGS. 1–3, the negative Belleville spring Bn will release from its initial condition and start to load the positive Belleville spring Bn at the points P1 and N2 on the respective curves Cp and Cn. The control force Fc1 at these points is one which resists release of energy from the negative Belleville spring Bn and the magnitude of the control force Fc1 is represented by the difference in the force exerted by the Belleville spring Bn and that resisted or balanced by the positive Belleville spring Bp. As the release of energy from the negative Belleville spring Bn proceeds, the control force Fc does not change substantially as may be appreciated by the condition on the curves in FIG. 5 at points P2 and N3. Also at this point, the force exerted between the reaction member represented by the backplate 18 in the clutch 10 and the load member represented by the pressure plate 16 builds to a force F1. At the point Inp in FIG. 5 where the curves Cn and Cp intersect, the control force Fc3 becomes zero, and the composite force exerted by the two springs between the reaction member and the loaded member is increased to a maximum force F2. Moreover, the springs will remain in this condition without a control force and retain the loading force F2.

To open the clutch 10 or to move the pressure plate 18a away from the cushion pad 14, for example, the control force Fc is exerted on the control cone 24 to reverse the transfer of energy from the now loaded positive Belleville spring Bp to the negative Belleville spring Bn, and the difference in energy supplied by the positive spring Bp and stored by the negative spring Bn is supplied by the product of control force and travel of the control cone. As in conventional foot pedal operation of an automotive clutch, the control force must be maintained to retain the clutch 10 disengaged and no control force is applied to maintain the clutch engaged.

Figure 9:
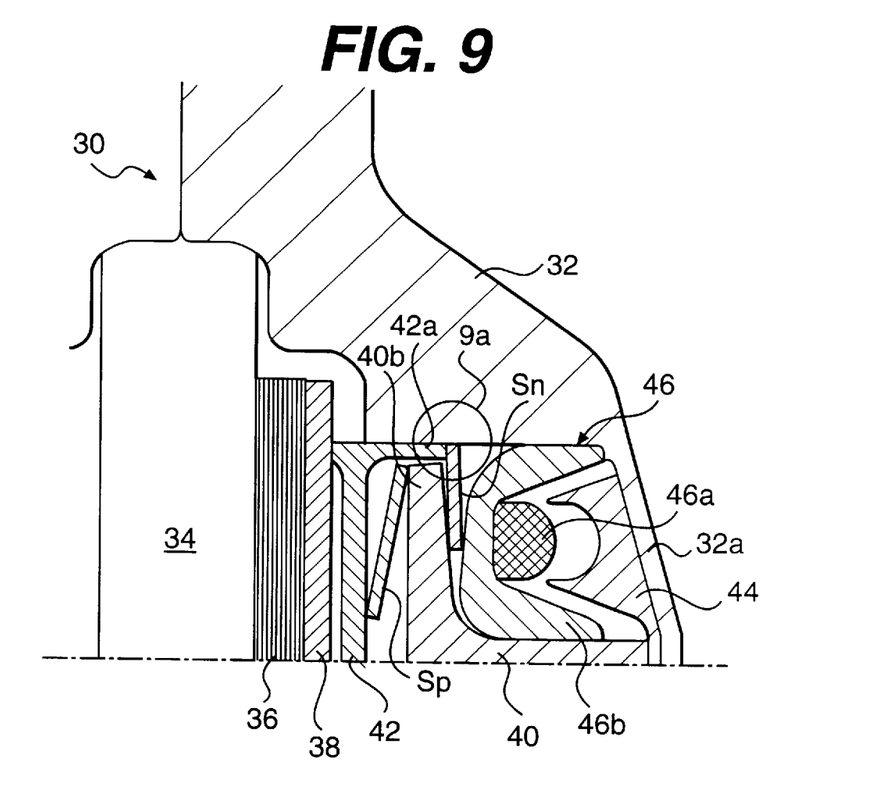
FIG. 9 is a fragmentary cross-section illustrating the actuating system of the invention applied to a disc brake.
Figure 9A:
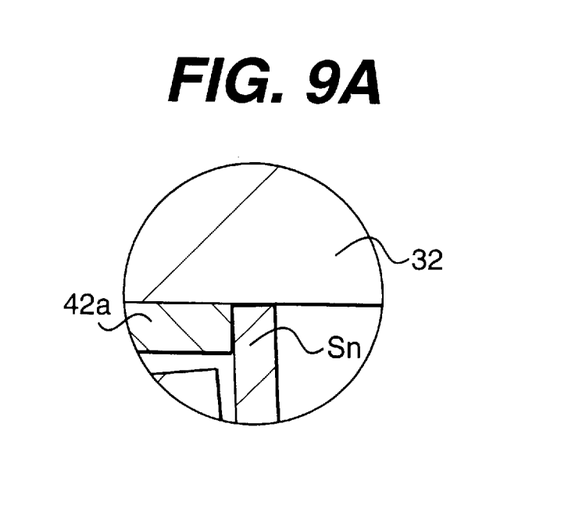
FIG. 9A is an enlarged illustration of parts in the sight circle 9A of FIG. 9.
Figure 10:
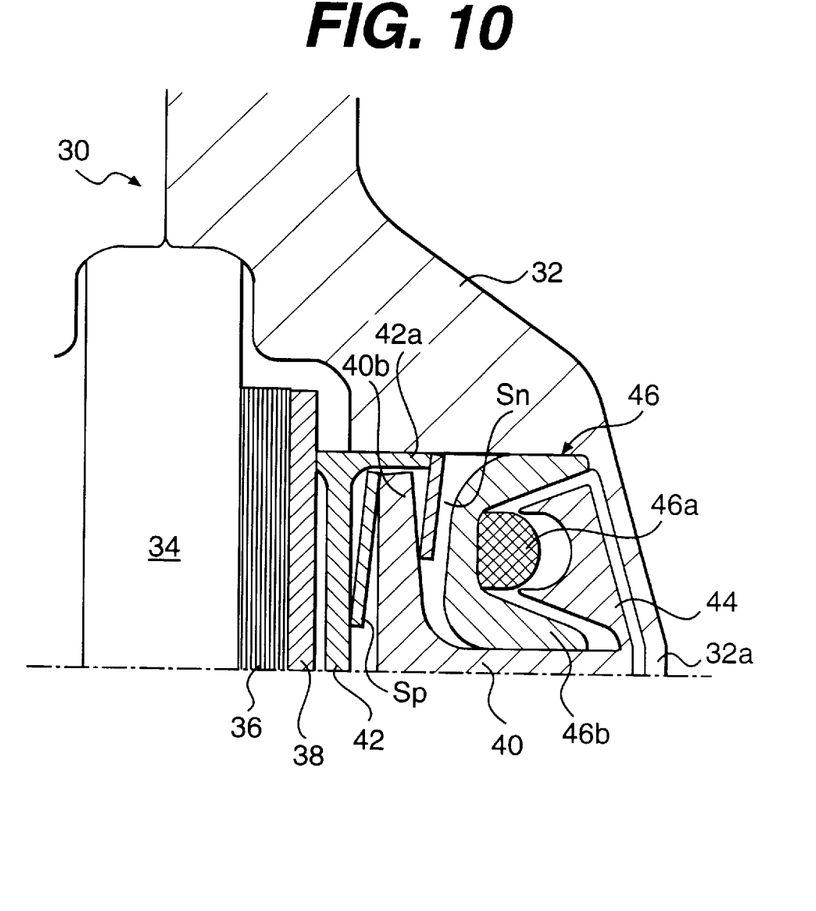
FIG. 10 is a fragmentary cross-section showing the actuator system of FIG. 9 with the brake in an actuated condition.

In FIGS. 9 and 10, the controlled force actuator of the present invention is used in a disc brake 30 having a caliper 32 and a disc 34 releasably engaged by a friction pad 36 secured to a backplate 38. The disc 34 is rotatable relative to the caliper 32 and the backplate with the friction pad 36 are secured against rotation relative to the caliper 34 in accordance with well known disc brake construction and operation.

In the illustrated embodiment, an axially movable shuttle 40, having an axial portion 40a and a radial portion 40b, is arranged so that the radial portion 40b lies between a positive Belleville spring Sp and a negative Belleville spring Sn. In this embodiment, the annular Belleville springs Sp and Sn are sized so that the inner and outer edges of the springs overlap. Thus, the inner edge of the negative Belleville spring Sn engages one side of the radial portion 40b of the shuttle 40 whereas the outer edge of the positive Belleville spring Sp engages the opposite side of the radial portion 40b. Also, the inner edge of the positive Belleville spring Sp engages a pressure plate 42 in abutment with the backplate 38 and the outer edge of the negative Belleville spring Sn engages axial fingers 42a on the pressure plate 38. The fingers 42a cooperate with the negative Belleville spring Sn in the same manner as the fingers 28 in the clutch of FIGS. 1–3.

As shown in FIGS. 9 and 10, the axial portion 40a of the shuttle 40 extends from the radial portion 40b to engage with an armature 44 initially positioned against a back wall portion 32a of the caliper 32 in FIG. 9. A solenoid 46, having a coil 46a and a breech 46b is positioned between the radial portion 42a of the shuttle and prevented from movement toward the armature 44. Thus, energization of the solenoid 46 will attract magnetically, the armature 44 from the position in FIG. 9, where the brake 30 is disengaged, to the position of FIG. 10 where the brake is engaged. Movement of the shuttle 40 accompanies such movement of the armature 44 to exert a control force Fc on the Belleville springs Sn and Sp.

Figure 6:
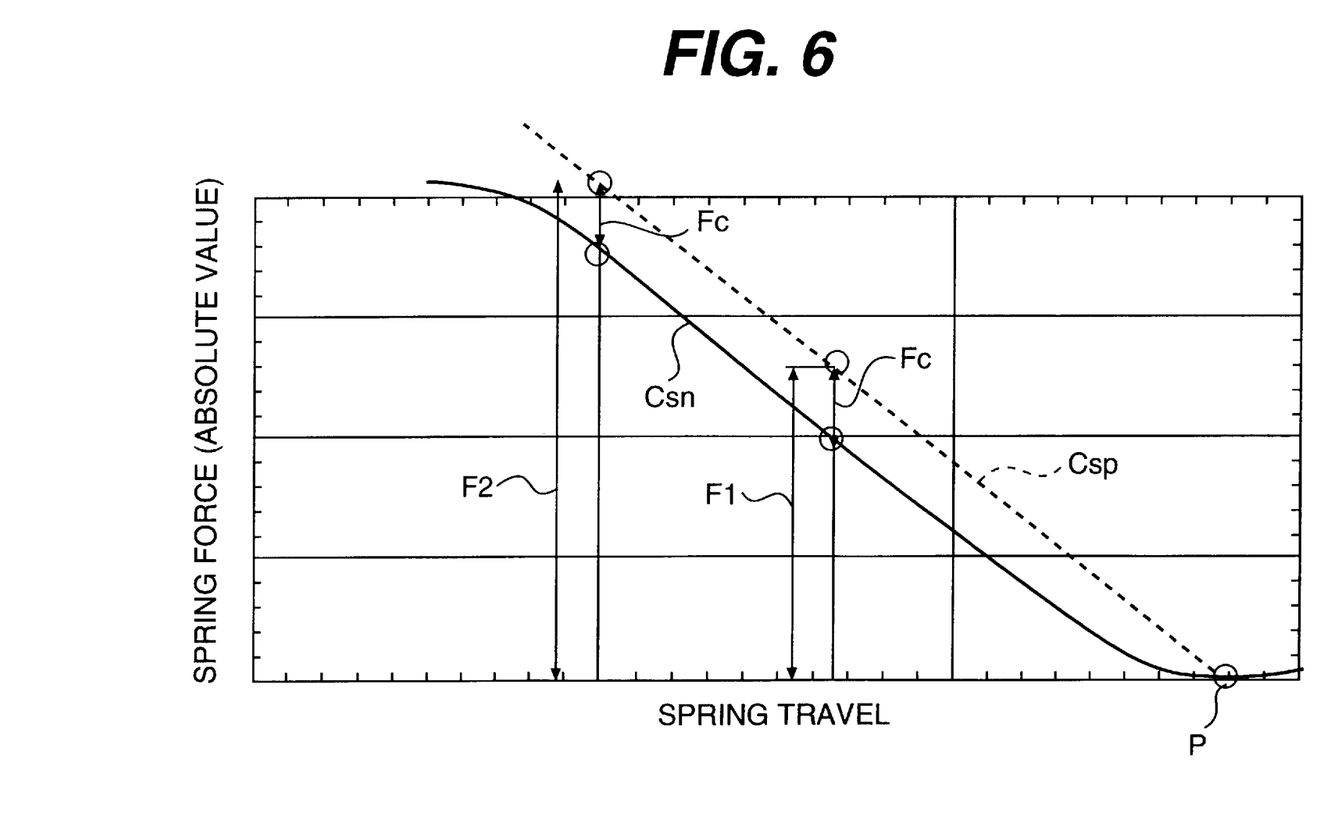
FIG. 6 is a graph, similar to that of FIG. 5, but representing force/deflection characteristics of respective positive and negative Belleville springs of a different design than those FIG. 5.
Figure 7:
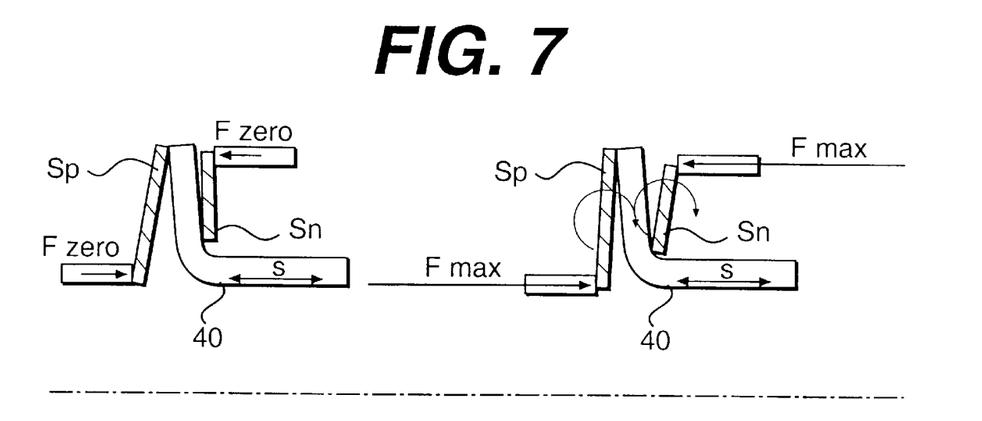
FIG. 7 is a schematic illustration of operating principles of the actuator of the invention.

The design characteristics of the Belleville springs Sn and Sp in the embodiment of FIGS. 9 and 10, together with their operation under a control force Fc exerted by the solenoid 46 on the armature 44 and shuttle 40, may be further understood by reference to FIG. 6 and 7 of the drawings. FIG. 6 is a graph showing force/travel characteristics of the respective positive and negative Belleville springs Sn and Sp on curves Csn and Csp, respectively. Although FIG. 6 is comparable in style to that of FIG. 5, it will be noted that in FIG. 6, the force released by the negative Belleville spring Sn per unit of spring travel generally is less than the force per unit spring travel stored in the positive Belleville spring Sp. As a result, the curves Csn and Csp intersect at a point P in FIG. 6 where both springs are in equilibrium at zero applied force. This condition also corresponds to that illustrated in FIG. 9, that is, the brake 10 is disengaged and will remain in that condition in the absence of a control force by the solenoid 46. As soon as a control force is applied to initiate the release of energy from the negative Belleville spring Sn, the force exerted by the negative Belleville spring will increase as reflected by the curve Csn in FIG. 6. Transfer of energy from the negative Belleville spring Sn to the positive Belleville spring Sp, however, will require force in excess of that released by the negative Belleville spring Sn. Such additional force is supplied by the solenoid as a control force Fc which, in this embodiment, is added to the force released by the negative Belleville spring. Moreover, when the brake 30 is fully engaged, the control force Fc is needed to maintain that fully engaged position. In the absence of the control force, the positive Belleville spring would have a force adequately higher than the force of the negative Belleville spring to return the negative Belleville spring to the point of point P.

The operation of force actuator system used in the brake 30 is further illustrated in FIG. 7. Thus, as shown on the left-hand side of FIG. 7, the force exerted by the Belleville springs Sn and Sp is zero but advanced to maximum by movement of the shuttle to augment the release of energy from the negative Belleville spring Sn.

Figure 11:
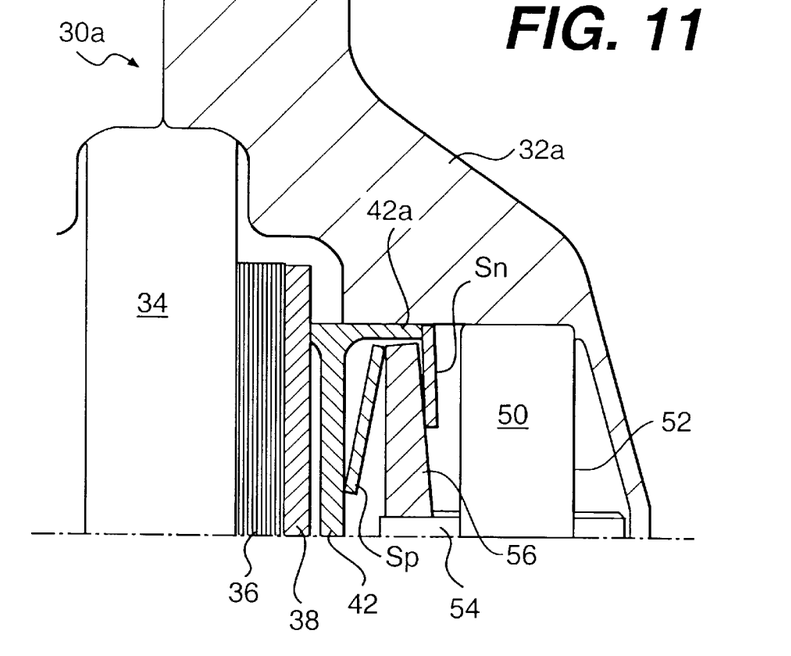
FIG. 11 is a fragmentary cross-section illustrating the actuating system of FIG. 9 modified to include a linear motor control.
Figure 12:
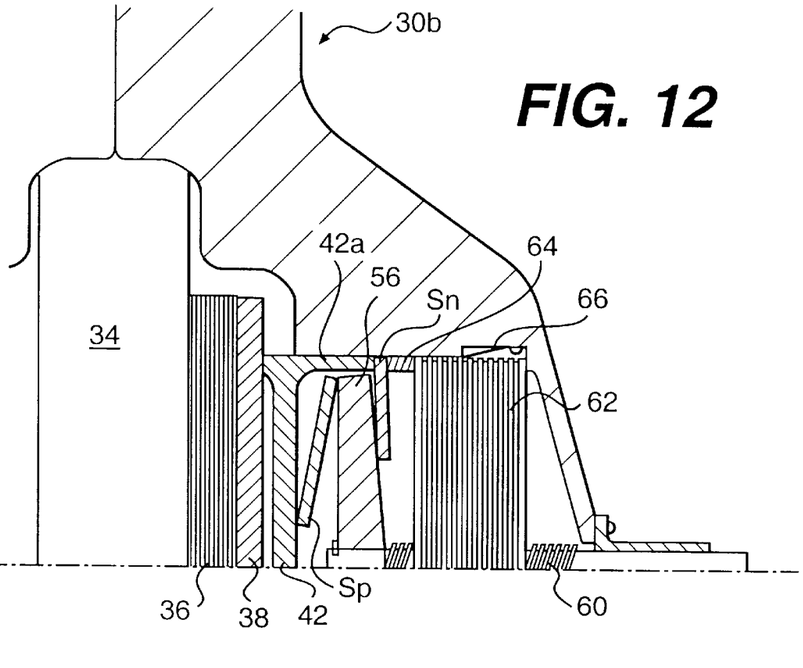
FIG. 12 is a fragmentary cross-section illustrating a modified actuator system for a disc brake.

In FIG. 11, a variation 30a of the brake 30 illustrated in FIGS. 9 and 10 is shown and in which the solenoid is replaced by a linear motor 50. In particular, the linear motor 50 includes an exterior housing 52 anchored against axial displacement in the caliper 32a and operable to advance a central threaded shaft 54 axially in opposite directions along with respect to the caliper 32b. The shaft 54 carries a radial plate 56 which functions identically as the annular portion 40b of the shuttle 40 in FIGS. 9 and 10.

In FIGS. 12–16 of the drawings, a variation 30b of the brake 30a illustrated in FIG. 11 is shown. In this embodiment, essentially the same brake and spring components are used but with a controlled force device in which a threaded flexible cable 60, to which the radial plate 56 is attached at its inner end, is threadably engaged with an exterior nut member 62 having a series of circumferential grooves in the exterior surface thereof. The nut member is spaced from the outside edge of the negative Belleville spring Sn by a slip ring 64 and is retained against the slip ring 64 by a spring-like ratchet pawl 66. The ratchet pawl engages the grooves on the exterior of the nut in a manner to retain the nut member 62 against displacement from the slip ring 64. The purpose of this arrangement is to compensate for a reduction in the thickness of the friction pad 36 as a result of wear in use.

Figure 13:
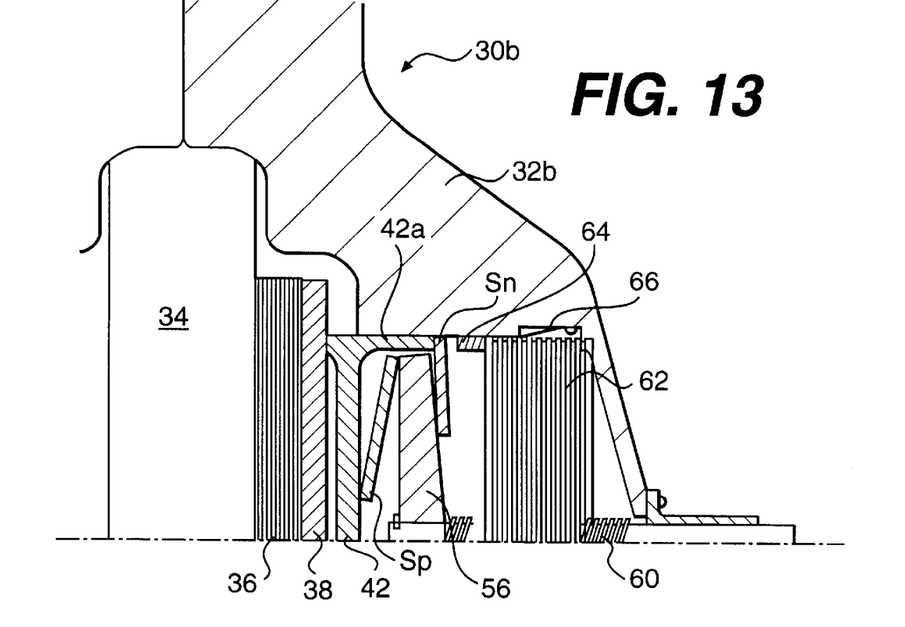
FIG. 13 and 14 show the actuator system of FIG. 12 in released and applied conditions in a brake with new friction pads.
Figure 14:
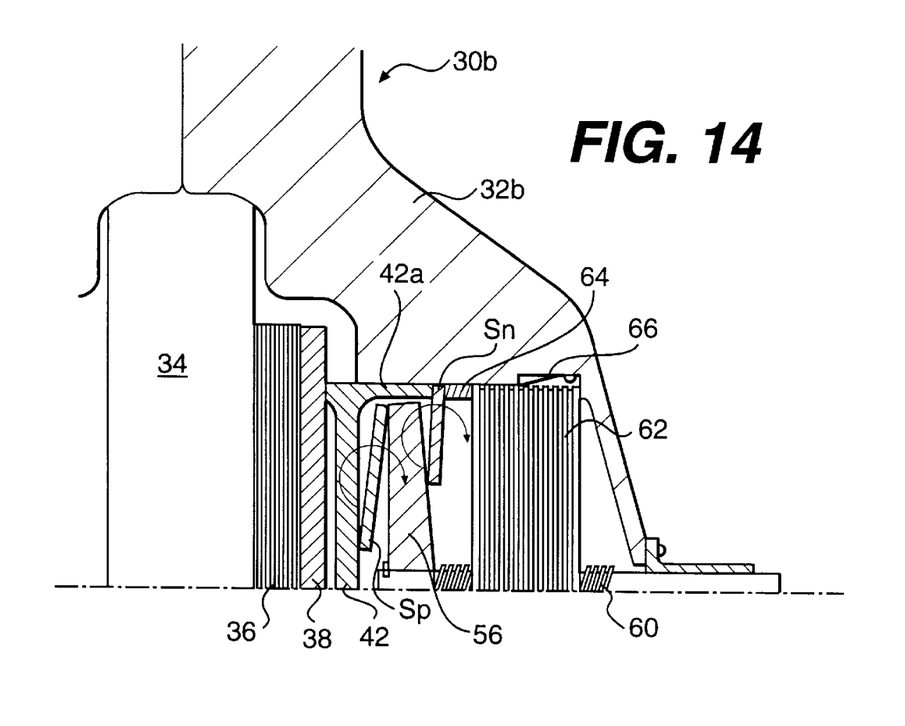
Figure 15:
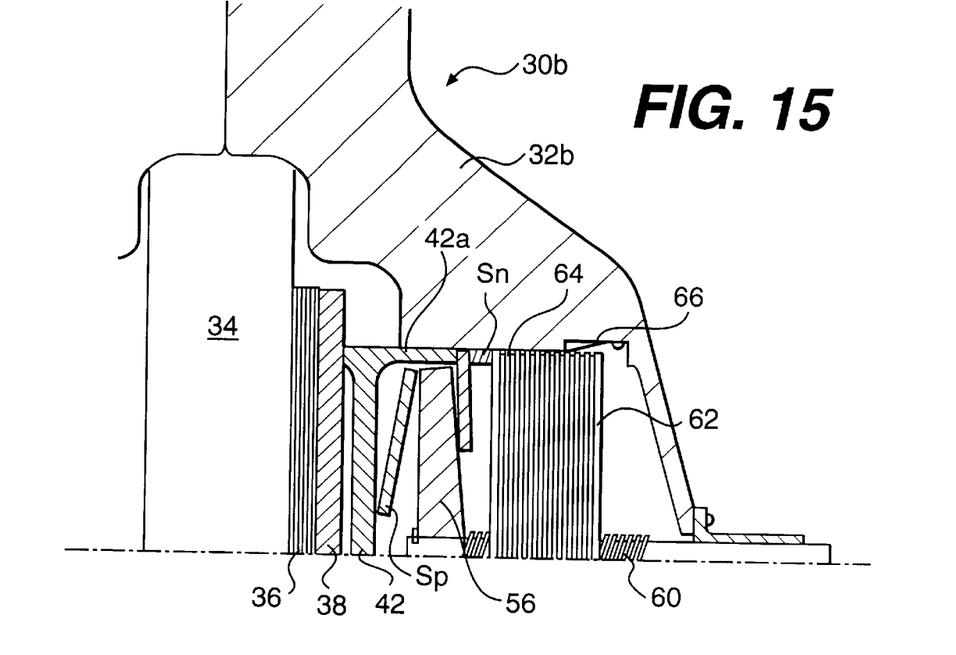
FIGS. 15 and 16 show the actuator system of FIG. 12 in released and applied conditions where the friction pads of the disc brake have worn down.
Figure 16:
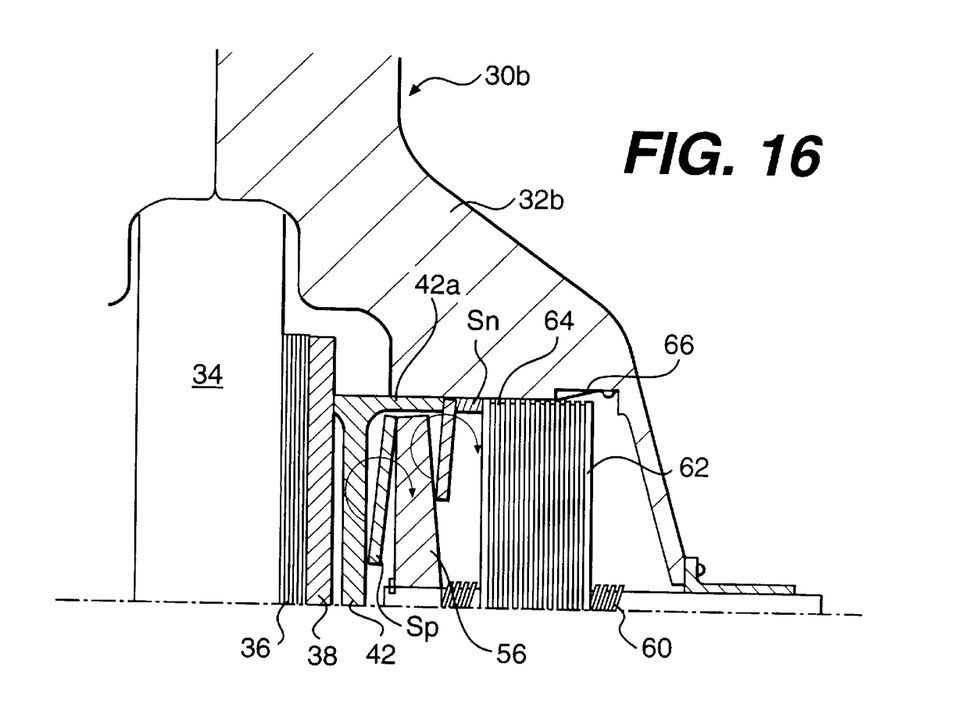

The operation of the brake embodiment 1ob may be understood from FIGS. 13–16 of the drawings. In FIGS. 13 and 14, the brake is shown respectively in released and braking engagement under conditions in which the friction pad 36 is relatively new and thus of maximum thickness. In FIGS. 15 and 16, the same respective conditions are illustrated but with a thinned down or worn friction pad. In operation from the released condition shown in FIG. 13, initial movement of the cable 60 will cause the nut member 62 to advance the slip ring 64 against the negative Belleville spring Sn. As soon as the pad 36 engages the disc 34, the cable will actuate the Belleville springs Sn and Sp to exert the friction force of the pad 36 against the disc 34. The pawl member 66 will retain the nut member 62 in the position to which it is so moved. Thus, as wear in the friction pad occurs, the force actuating mechanism will compensate automatically.

Figure 17:
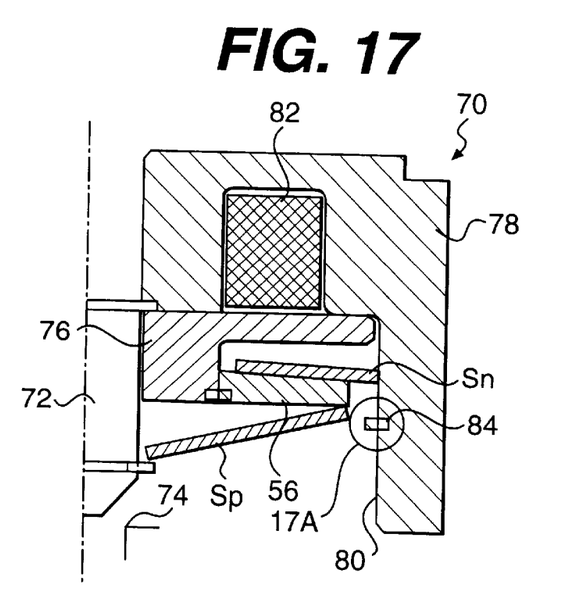
FIG. 17 is a fragmentary cross-section illustrating the actuating system of the invention applied to a fuel injector valve.
Figure 17A:
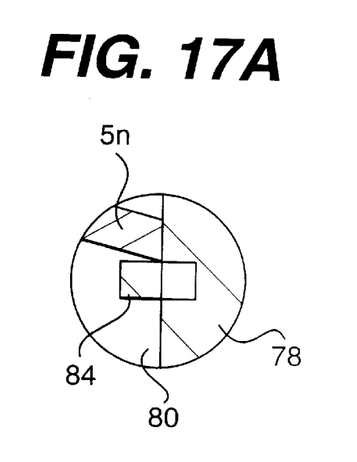
FIG. 17A is an enlarged illustration of parts in the sight circle 17A of FIG. 17.
Figure 18:
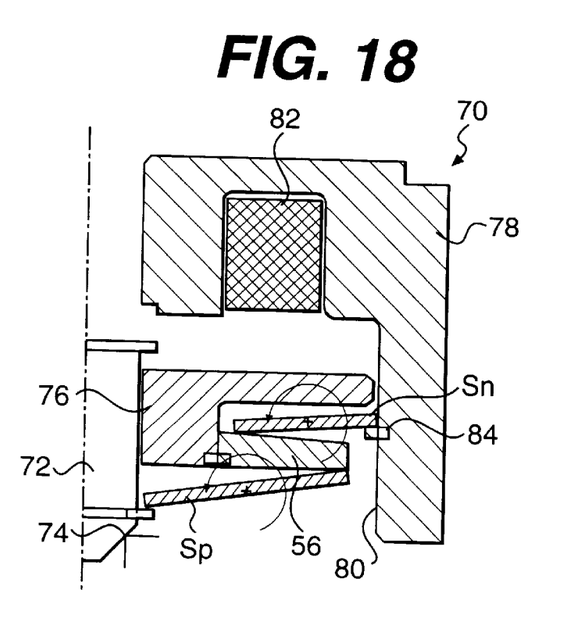
FIG. 18 is a fragmentary cross-section illustrating the actuating system of FIG. 17 in a different condition of operation.

In FIGS. 17 and 18, the controlled force actuating system of the present invention is shown in combination with a fuel injection system designated generally by the reference numeral 70, in which movement of a fuel injection needle is controlled through the action of a hydraulic spool valve. In this application, the same positive negative Belleville springs Sp and Sn, respectively, are used together with the radial plate 56 described above with respect to the applications of the actuator to friction brake variations. In this application, a valve body 72 is advanced by spring force into engagement with a seat 74 and retracted from the seat. The retracted condition of the valve is shown in FIG. 17 whereas the engaged condition of the valve is shown in FIG. 18.

The radial plate 56 of the valve 70 is connected to an armature 76 movable independently of the valve body 72. The armature 76 is also movable vertically in a stationary breech 78 having an inner cylindrical surface. An electromagnetic coil 82 is fixed within the breech 78.

The coil 82 is energized to retract the valve body 72 from the seat, as shown in FIG. 17, by attraction of the armature 76 upwardly against the lower portion of the breech 78. In this position, the negative Belleville spring Sn is spaced from a slip ring 84 located below the negative Belleville spring Sn.

When the electromagnetic coil 82 is deactivated, a hydraulic force applied on the valve body 72 will move the valve body 72 and the armature 76 toward the seat 74. The negative Belleville spring Sn will move with the armature 76 until the outer edge of that spring engages the stop 84. This engagement of the negative Belleville spring with the stop 84 initiates release of energy from the negative Belleville spring to move the valve body 72 into firm engagement with the seat 74. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A controlled force actuating system comprising:
   a positive spring and a negative Belleville storing arranged in series between a load member and a reaction member, the positive spring having a positive force/deflect on ratio and being initially in a relaxed condition and the negative Belleville spring having a negative force/deflection ratio and being initially in a loaded energy storing condition; and
   a movable control device engaging at least one of the positive spring and the negative Belleville spring so that movement of the control device effects a transfer of stored energy from the negative Belleville spring to the positive spring, thereby to apply a range of applied force between the reaction member and the load member, the range of applied force varying between minimum and maximum values of applied force, and the negative and positive force deflection ratios being related so that the positive and negative springs are in equilibrium at one of the minimum and maximum values of applied force and so that the absolute values of the force deflection ratios differ by a control force in the control device that remains substantially the same for changes in deflection of the positive and negative springs throughout the remainder of the applied range of forces.

2. The controlled force actuating system of claim 1, wherein the rate of energy release from the negative Belleville is substantially the same as the rate of energy storage by the positive spring, thereby to minimize the control force required to move the control device.

3. The controlled force actuating system of claim 1, wherein the rate of energy release from the negative Belleville is greater than the rate of energy storage by the positive spring, whereby the control device exerts a control force absorbing energy release in an amount substantially equal to the difference between the energy released and the energy stored.

4. The controlled force actuating system of claim 1, wherein the rate of energy release from the negative Belleville is less than the rate of storage by the positive spring, whereby the control device exerts a control force adding energy in an amount substantially equal to the difference between the energy released and the energy stored.

5. The controlled force actuating system of any one of claims 1–4, wherein the control device engages an interface between the positive spring and the negative Belleville spring.

6. The controlled force actuating system of any one of claims 1–4, wherein the positive spring is a Belleville spring.

7. The controlled force actuating system of claim 6, wherein the Belleville springs have inner and outer edges defining respective inner and outer diameters, and wherein the inner diameter of the one Belleville spring is greater than the outer diameter of the other Belleville spring, the control device having an axially moving engaging portion between the positive and negative Belleville springs.

8. The controlled force actuating system of claim 6, wherein the Belleville springs have inner and outer edges defining respective inner and outer diameters, and wherein the inner diameter of the one Belleville spring is smaller than the outer diameter of the other Belleville spring, the control device having an axial movable radial engaging portion between the positive and negative Belleville springs.

9. An automotive clutch comprising:
a friction pad to releasably couple a rotatable power input to a power output;
a pressure plate arranged to transmit a range of normal force to the friction pad, the range of normal force varying between minimum and maximum values;
a back plate rotatable with the power input and spaced from the pressure plate; and
a controlled force actuating system including a positive spring and a negative Belleville spring arranged in series between the pressure plate and the back plate, the positive spring having a positive force/deflection ratio and being initially in a relaxed condition and the negative Belleville spring having a negative force/deflection ratio and being initially in a loaded energy storing condition, and a movable control device engaging at least the negative Belleville spring so that movement of the control device releases stored energy from the negative Belleville spring to the positive spring, thereby to apply the combined energy stored in both the positive and negative Belleville springs between the back plate and the pressure plate, the negative and positive force deflection ratios being related so that the positive and negative springs are in equilibrium at the maximum value of normal force and so that the absolute values of the force deflection ratios differ by a control force in the control device that remains substantially the same for changes in deflection of the positive and negative springs throughout the remainder of the range of normal force.

10. The automotive clutch of claim 9, wherein the rate of energy release from the negative Belleville is greater than the rate of energy storage by the positive spring, whereby the control device exerts a control force resisting the energy release in an amount substantially equal to the difference between the force of energy release and the force of energy storage.

11. A friction brake comprising:
a fixed support;
a rotatable member;
a friction pad mounted on the fixed support for frictional engagement with the rotatable member under a range of normal force varying between minimum and maximum values;
a controlled force actuating system including a positive spring and a negative Belleville spring arranged in series between the friction pad and the fixed support, the positive spring having a positive force/deflection ratio and being initially in a relaxed condition and the negative Belleville spring having a negative force/deflection ratio and being initially in a loaded energy storing condition, and a movable control device engaging at least the negative Belleville spring so that movement of the control device releases stored energy from the negative Belleville spring to the positive spring, thereby to apply the combined energy stored in both the positive and negative Belleville springs between the fixed support and the friction pad, the negative and positive force deflection ratios being related so that the positive and negative springs are in equilibrium at the minimum value of normal force and so that thee absolute values of the force deflection ratios differ by a control force in the control device that remains substantially the same for changes in deflection of the positive and negative springs throughout the remainder of the range of normal force.

12. The friction brake of claim 11, wherein the rate of energy release from the negative Belleville is less than the rate of storage by the positive spring, whereby the control device exerts a control force in addition to the energy release in an amount substantially equal to the difference between the force of energy release and the force of energy storage.

13. The method of applying a range of actuating force between a load member and a reaction member, the range varying between minimum and maximum values, the method comprising the steps of:
arranging a positive spring and a negative Belleville spring in series between the load and reaction members so that the positive spring is initially relaxed and the negative Belleville spring is initially loaded with energy; and
releasing the energy in the negative Belleville spring to the positive spring at a substantially constant rate of energy transfer throughout the range between the minimum and maximum values, whereby the combined energy stored in both the positive and negative Belleville springs is substantially applied between the reaction member and the load member.

14. The method of claim 13, wherein the energy is released from the negative Belleville at a rate greater than the rate of energy storage by the positive spring, and exerting a control force resisting the energy release in an amount substantially equal to the difference between the force of energy release and the force of energy storage.

15. The method of claim 13, wherein the energy is released from the negative Belleville at a rate less than the rate of energy storage by the positive spring, and exerting a control force in addition to the energy released in an amount substantially equal to the difference between the force of energy release and the force of energy storage.

16. A controlled force actuating system comprising:

a positive spring and a negative Belleville spring arranged in series between a load member and a reaction member, the positive spring having a positive force/deflection ratio and being initially in an energy receiving condition and the negative Belleville spring having a negative force/deflection ratio and being initially in a loaded energy storing condition; and a movable control device engaging at least one of the positive spring and the negative Belleville spring so that movement of the control device effects a transfer of stored energy from the negative Belleville spring to the positive spring, thereby to apply a range of applied force between the reaction member and the load member, the range of applied force varying between minimum and maximum values of applied force, and the negative and positive force deflection ratios being related so that the absolute values of the force deflection ratios differ by a control force in the control device that remains substantially the same for changes in deflection of the positive and negative springs substantially throughout the applied range of forces.

17. The controlled force actuating system of claim 16, wherein the negative and positive force deflection ratios are further related so that the positive and negative springs are in equilibrium at one of the minimum and maximum values of applied force.

18. The controlled force actuating system of claim 16, wherein the rate of energy release from the negative Belleville is substantially the same as the rate of energy storage by the positive spring, thereby to minimize the control force required to move the control device.

19. The controlled force actuating system of claim 16, wherein the rate of energy release from the negative Belleville is greater than the rate of energy storage by the positive spring, whereby the control device exerts a control force absorbing energy release in an amount substantially equal to the difference between the energy released and the energy stored.

20. The controlled force actuating system of claim 19, wherein the negative and positive force deflection ratios are further related so that the positive and negative springs are in equilibrium at the maximum value of applied force.

21. The controlled force actuating system of claim 16, wherein the rate of energy release from the negative Belleville is less than the rate of storage by the positive spring, whereby the control device exerts a control force adding energy in an amount substantially equal to the difference between the energy released and the energy stored.

22. The controlled force actuating system of claim 21, wherein the negative and positive force deflection ratios are further related so that the positive and negative springs are in equilibrium at the minimum value of applied force.

* * * * *

UNITED STATES PATENT AND TRADEMARK OFFICE
CERTIFICATE OF CORRECTION

PATENT NO. : 5,887,691
DATED : March 30, 1999
INVENTOR(S) : KEMPER

It is certified that error appears in the above-indentified patent and that said Letters Patent is hereby corrected as shown below:

Claim 1, col. 8, line 54, "force/deflect on" should read --force/deflection--.

Claim 11, col. 10, line 43, "thee" should read --the--.

Signed and Sealed this

Third Day of August, 1999

Attest:

Attesting Officer

Q. TODD DICKINSON

Acting Commissioner of Patents and Trademarks